(12) United States Patent
Kamel et al.

(10) Patent No.: US 7,414,476 B2
(45) Date of Patent: Aug. 19, 2008

(54) SENSOR INTERFACE CIRCUITRY HAVING ADJUSTABLE GAIN AND Q, AND METHOD FOR ADJUSTING SENSOR INTERFACE CIRCUITRY GAIN AND Q

(75) Inventors: Ashraf K. Kamel, Indianapolis, IN (US); Robert W Koseluk, Carmel, IN (US); Kevin M. Gertiser, Kokomo, IN (US); Larry R. Hach, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 125 days.

(21) Appl. No.: 11/588,136

(22) Filed: Oct. 26, 2006

(65) Prior Publication Data

US 2008/0100379 A1    May 1, 2008

(51) Int. Cl.
*H03F 3/30* (2006.01)
(52) U.S. Cl. ......................... 330/282; 330/86
(58) Field of Classification Search ................. 330/282, 330/86, 310, 254
See application file for complete search history.

(56) References Cited

U.S. PATENT DOCUMENTS 7,068,107 B2 * 6/2006 Wang et al. ................. 330/282

7,161,419 B2 * 1/2007 Tei et al. ........................ 330/9

\* cited by examiner

*Primary Examiner*—Robert Pascal
*Assistant Examiner*—Hieu P Nguyen
(74) *Attorney, Agent, or Firm*—Jimmy L. Funke

(57) ABSTRACT

A sensor interface filter having adjustable gain and Q is provided. The sensor interface includes a first operational amplifier coupled to gain circuitry, a gain stage, and a resistor. The gain circuitry and gain stage are electrically coupled to each other. The gain stage includes a gain stage switch, and is coupled to control circuitry. The control circuitry controls the state of the gain stage switch to vary the number of feedback current paths providing feedback to the inverting input of the first operational amplifier, altering the gain provided by the first operational amplifier. The sensor interface further includes a second operational amplifier coupled to filter circuitry and feedback switches. The feedback switches are coupled to the control circuitry, which controls the state of the feedback switches to vary the gain provided by the second operational amplifier and the filter Q of the sensor interface. A method is also provided.

22 Claims, 3 Drawing Sheets

SENSOR INTERFACE CIRCUITRY HAVING ADJUSTABLE GAIN AND Q, AND METHOD FOR ADJUSTING SENSOR INTERFACE CIRCUITRY GAIN AND Q

TECHNICAL FIELD

The present invention is generally directed to sensor interface circuitry, and, more specifically, to circuitry and methods for electronically altering filter and gain characteristics of sensor interface circuitry.

BACKGROUND OF THE INVENTION

Engine knock, which can create uncontrolled combustion in vehicle internal combustion engines, is a condition that typically occurs when ignition timing of the vehicle engine is advanced improperly. To avoid engine knock, which can lead to engine damage, engine knock sensors are often used. Engine knock sensors are typically configured to detect which cylinder or cylinders of an internal combustion engine are experiencing a knock condition. When engine knock sensors are coupled to vehicle engine control modules that control the operation of the engine, the vehicle engine control module can monitor the engine knock sensors, and modify the ignition timing of the engine until the knock condition is no longer detected by the engine knock sensors. Engine knock sensors can also be employed to help vehicle engine control modules to determine how to adjust the timing of the engine to provide improved fuel economy and torque.

To detect engine knock conditions, engine knock sensors typically require the use of appropriate sensor interface circuitry and adequate filtering in order for a system employing an engine knock sensor to correctly detect knock signals issued by the engine knock sensors. Typical engine knock sensor interfaces sense the knock signals provided by engine knock sensors differentially, and then use a first or second order low-pass filter to filter the knock signal. The filtered signal is then typically provided to an analog-to-digital converter for conversion into digital form, so that the digitized knock signal can be analyzed by digital processing circuitry to determine if an engine knock condition is occurring. The nature of the filter required to optimally filter the knock signal typically depends, in part, on the speed of the analog-to-digital converter to which the filtered signal is provided. Higher order filters having higher filter Q factors are typically desired for systems employing slower analog-to-digital converters. However, filters having a higher order and a higher filter Q factor are typically not necessary for systems employing fast analog-to-digital converters. Some interface integrated circuit manufacturers integrate a second order filter structure on the interface integrated circuit, so that the interface integrated circuit can be more easily used with slower analog-to-digital converters. While this may prove beneficial for systems employing a slow analog-to-digital converter, additional die area is typically required for the second order filter structure, and additional cost in terms of system architecture may also be required to support the second order filter structure. These added costs can make the use of an integrated circuit having integrated second order filter structure less than optimal for systems employing a fast analog-to-digital converter, and therefore, not typically requiring a second order filter structure. In addition, by providing an integrated second order filter having a higher Q, the gain of the output signal is increased above the level it would have if a first order filter with a lower Q were employed. This additional gain in the output signal typically leads to loss of signal dynamic range.

What is needed is interface circuitry having gain and Q characteristics that can be easily modified through the use of components external to an interface integrated circuit, and through electronic signals provided to the interface integrated circuit, such that a single integrated circuit can be reconfigured to be used to support multiple platforms having analog-to-digital converters of various speeds.

SUMMARY OF THE INVENTION

In accordance with one aspect of the present invention, an adjustable sensor interface is provided. The sensor interface includes a first operational amplifier coupled to gain circuitry, a gain stage, and a resistor. The gain circuitry and gain stage are electrically coupled to each other. The sensor interface further includes control circuitry coupled to the gain stage. The gain stage includes a gain stage switch having an open and closed state. The control circuit is configured to control the state of the gain stage switch to vary the number of feedback current paths providing feedback to the inverting input of the operational amplifier, and to vary the gain provided by the operational amplifier.

In accordance with another aspect of the present invention, a method for adjusting the gain and Q of a sensor interface is provided. The method includes the steps of providing a sensor interface including a filter circuitry having a gain and filter Q, and including a gain section having a gain. The method further includes the steps of providing a target signal indicative of a target Q to the filter circuitry and altering the gain and Q of the filter circuitry based on the target signal. The method still further includes the steps of providing a gain signal indicative of the filter gain to the gain section, and adjusting the gain of the gain section such that the gain of the filter is offset by the gain of the gain section.

In accordance with yet another aspect of the present invention, an adjustable sensor interface is provided. The sensor interface includes a first operational amplifier coupled to gain circuitry, a gain stage, and a resistor. The gain circuitry and gain stage are electrically coupled to each other. The sensor interface further includes control circuitry coupled to the gain stage. The gain stage includes a gain stage switch having an open and closed state. The control circuit is configured to control the state of the gain stage switch to vary the number of feedback current paths providing feedback to the inverting input of the operational amplifier, and to vary the gain provided by the first operational amplifier. The sensor interface further includes filter circuitry coupled both to the output of the first operational amplifier and to a second operational amplifier. The output of the second operational amplifier is coupled to a non-inverting input of the second operational amplifier, and to feedback switches coupled to the inverting input of the second operational amplifier. The feedback switches have on and off states, and are coupled to the control circuitry. The control circuitry is configured to control the state of the feedback switches to vary the gain of the second operational amplifier.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
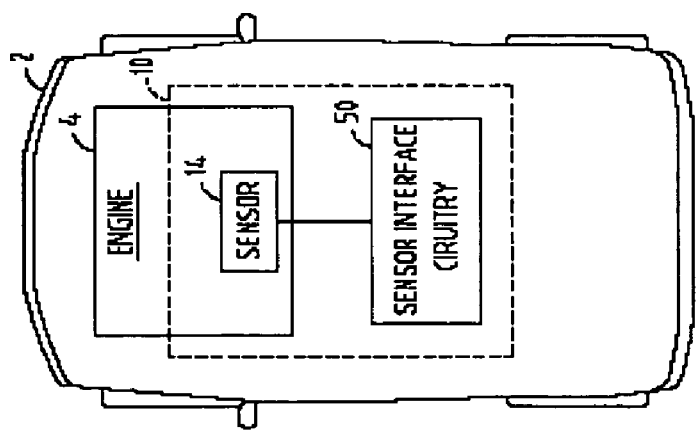
FIG. 1 is a schematic diagram generally illustrating a vehicle including sensor interface circuitry, according to one embodiment of the present invention.

Referring to FIG. 1, an exemplary automotive vehicle 2 is generally illustrated, employing sensor interface circuitry 50, according to one embodiment of the present invention. As shown, automotive vehicle 2 includes an internal combustion engine 4 and a sensor system 10. Sensor system 10 includes a vehicle sensor 14 and sensor interface circuitry 50. In the exemplary embodiment shown, vehicle sensor 14 is a piezoelectric engine knock sensor for sensing an engine knock condition exhibited by the internal combustion engine 4. In an alternate embodiment, vehicle 2 also includes wheel speed sensors (not shown) electrically coupled to sensor interface circuitry 50. While the vehicle sensor 14 shown and described herein is an engine knock sensor, it should be appreciated that other sensors may be used with the sensor interface circuitry 50 without departing from the teachings of the present invention.

In the present embodiment, sensor interface circuitry 50 is configured to receive signals, particularly voltages and/or currents, associated with engine knock sensor 14, and filter those voltages and/or currents before providing them as an output of sensor interface circuitry 50. The output of sensor interface circuitry 50 is provided to an analog-to-digital converter (not shown), which provides the digitized sensor signals to additional circuitry (not shown) for processing to determine if the signals provided by engine knock sensor 14 are indicative of an engine knock condition.

Figure 2:
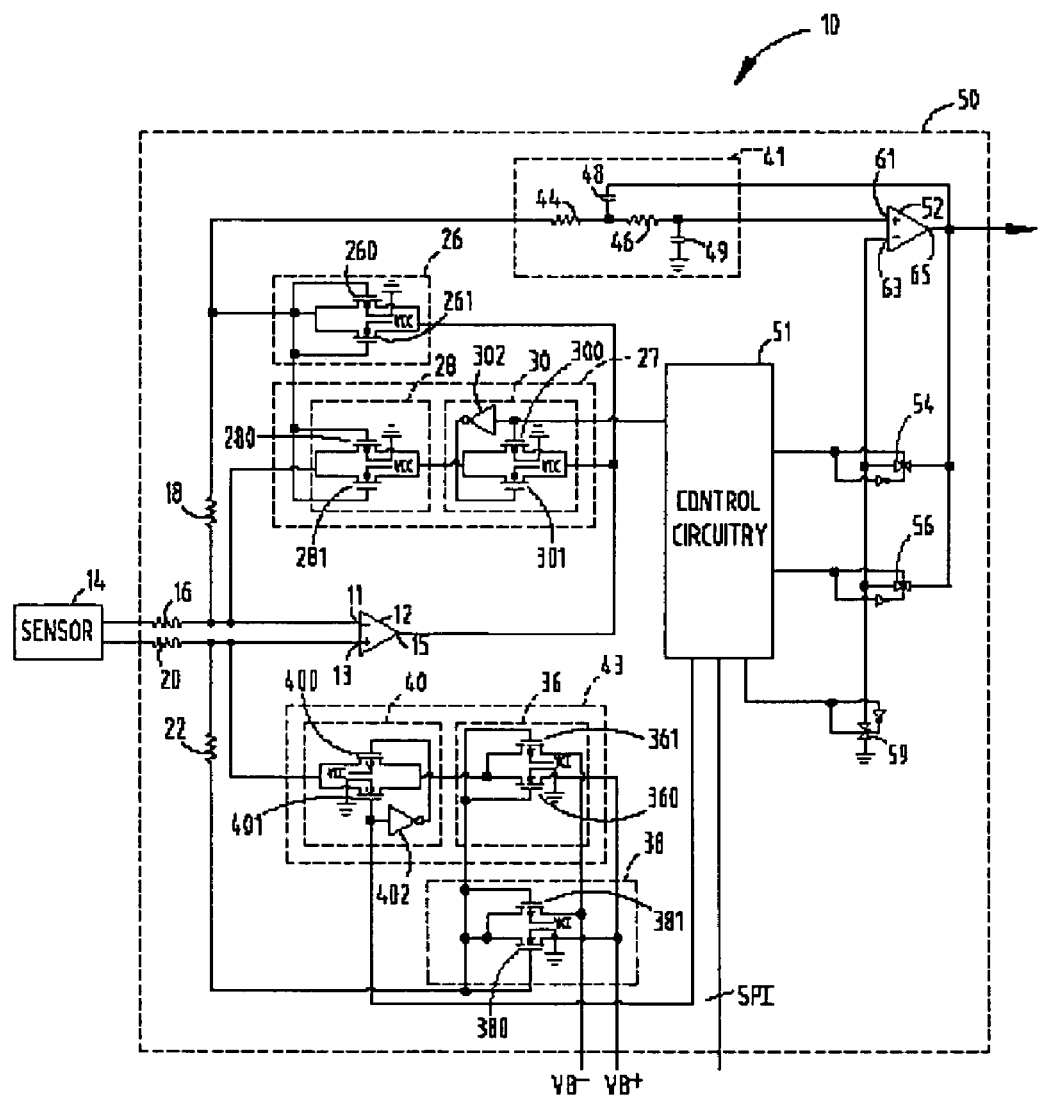
FIG. 2 is a block/circuit diagram generally illustrating sensor interface circuitry, according to one embodiment of the present invention.

Referring to FIG. 2, additional detail of the sensor system 10 is provided, according to one embodiment. Sensor system 10 is shown including sensor interface circuitry 50, which is electrically coupled to a vehicle sensor 14. In the present embodiment, sensor interface circuitry 50 includes an operational amplifier 12 having an inverting input 11, a non-inverting input 13, and an output 15. As shown in FIG. 2, a first output of sensor 14 is electrically coupled to the inverting input 11 of operational amplifier 12 via an input resistor 16, while a second output of sensor 14 is electrically coupled to the non-inverting input 13 of operational amplifier 12 via an input resistor 20. The output 15 of operational amplifier 12 is electrically coupled to the inverting input 11 of operational amplifier 12 via a feedback resistor 18 and gain circuitry 26. The output 15 of operational amplifier 12 is also electrically coupled to a switch 30. Switch 30 is electrically coupled to the input of gain circuitry 28, which has its output electrically coupled to the inverting input 11 of operational amplifier 12. When switch 30 is open, a first feedback current, referred to herein as FC1, flows through the feedback resistor 18. This first feedback current FC1 is in part a function of the output 15 of operational amplifier 12. When switch 30 is closed, the output 15 of operational amplifier 12 is electrically coupled to the input of gain circuitry 28. Gain circuitry 28 and gain circuitry 26 are coupled to each other and configured such that when switch 30 is closed, feedback current flowing between the output 15 of operational amplifier 12 and the inverting input 11 of operational amplifier 12 is divided equally, with approximately ½ of the feedback current flowing through gain circuitry 26 and feedback resistor 18, and approximately ½ of the feedback current flowing through gain circuitry 28. As noted above, both gain circuitry 26 and gain circuitry 28 are electrically coupled to the inverting input 11 of operational amplifier 12. By varying the current provided to the inverting input 11 of operational amplifier 12 through the opening and closing of switch 30, the gain through operational amplifier 12 can be altered.

In the present embodiment, gain circuitry 26 is a pair of transistors, including a P-channel transistor 261 and an N-channel transistor 260, and gain circuitry 28 is a pair of transistors, including an N-channel transistor 280, and a P-channel transistor 281. The transistors of gain circuitry 26 and gain circuitry 28 are coupled to each other and to the output 15 of operational amplifier 12 in a current mirror configuration, such that when switch 30 is closed, the current provided through gain circuitry 26 and gain circuitry 28 is equal in magnitude. More specifically, the gates of the transistors of gain circuitry 26 and gain circuitry 28 are tied together such that a current of equal magnitude flows through each of the gain circuitry 26 and gain circuitry 28 when switch 30 is closed. As noted above, when switch 30 is open, a feedback current of magnitude FC1 flows through feedback resistor 18 and gain circuitry 26. When switch 30 is closed, the feedback current is divided, and flows through each of gain circuitry 26 and gain circuitry 28. It should be appreciated that in alternate embodiments, gain circuitry 26 and 28 can be configured using components other than N-channel and P-channel transistors, provided that the current flowing via gain circuitry 26 and 28 is approximately equal when switch 30 is closed. In the present embodiment, switch 30 comprises an N-channel transistor 300, a P-channel transistor 301, and an inverter 302 configured to couple and decouple the input of gain circuitry 28 to the output 15 of operational amplifier 12 based on signals received from control circuitry 50. In alternate embodiments, switch 30 may comprises elements other than N-channel and P-channel transistors and inverters, provided that switch 30 is configured to couple and decouple the input of gain circuitry 28 to the output 15 of operational amplifier 12 based on signals received from control circuitry 51. For the sake of convenience, the combination of gain circuitry 28 and switch 30 may be referred to as gain stage 27.

Sensor interface circuitry 50 is also shown including a voltage being provided as an input to non-inverting input 13 of operational amplifier 15 via feedback resistor 22. In the present embodiment, the voltage is a function of voltages VB+ and VB− provided to gain circuitry 38. In the present embodiment, a supply voltage VCC approximately equal to 5 volts is provided to sensor interface circuitry 50, and the voltage provided by gain circuitry 38 is approximately equal to VCC divided by 2. In alternate embodiments, the voltage provided by gain circuitry 38 may have other values. Sensor interface circuitry 50 also includes gain circuitry 36 electronically coupled to a switch 40 and to voltages VB+ and VB−. The output signal provided by gain circuitry 36 is in part a function of the voltages VB+ and VB−. Switch 40 is electrically coupled to the non-inverting input 13 of operational amplifier 12 such that when switch 40 is closed, the output of gain circuitry 36 is coupled to the non-inverting input 13 of operational amplifier 12. When switch 40 is open, a second feedback current, referred to as FC2, flows through the feedback resistor 22. This current is in part a function of the voltage provided by gain circuitry 38 and the resistance of feedback resistor 22. When switch 40 is closed, the output of gain circuitry 36 is electrically coupled to the non-inverting input 13 of operational amplifier 12 via switch 40. Gain circuitry 36 and gain circuitry 38 are electrically coupled to each other such that when switch 40 is closed, the feedback current is approximately equally divided, with ½ of the current flowing through gain circuitry 38 and feedback resistor 22, and ½ of the current flowing through gain circuitry 36. In this manner, by opening and closing switch 40, the gain through operational amplifier 12 may be altered.

In the present embodiment, gain circuitry 38 is made up of two transistors, an N-channel transistor 380, and a P-channel transistor 381. Gain circuitry 36 is also made up of two transistors, an N-channel transistor 360, and a P-channel transistor 361. As was the case with gain circuitry 26 and gain circuitry 28 above, gain circuitry 38 and gain circuitry 36 in the present embodiment are coupled to each other and to the voltages VB+ and VB−, and are configured to operate in a current mirror configuration such that when switch 40 is closed, the current provided through gain circuitry 38 and gain circuitry 28 is equal in magnitude. More specifically, the gates of the transistors of gain circuitry 36 and gain circuitry 38 are tied together such that equal current flows through each of the gain circuitry 36 and gain circuitry 38 when switch 40 is closed. As noted above, when switch 40 is open, a current of magnitude FC2 flows through feedback resistor 22 and gain circuitry 38. When switch 40 is closed, the current is divided, with approximately ½ of the current flowing through each of gain circuitry 38 and 36. By altering the current provided at the non-inverting input 13 of operational amplifier 12, the gain of operational amplifier 12 can be varied. It should be appreciated that in alternate embodiments, gain circuitry 36 and 38 can be implemented with circuitry other than N-channel and P-channel transistors, provided that the current flowing through gain circuitry 36 and 38 is approximately equal when switch 40 is closed. In the present embodiment, switch 40 comprises and N-channel transistor 401, a P-channel transistor 400, and an inverter 402 configured to couple and decouple the output of gain circuitry 36 to the non-inverting input 13 of operational amplifier 12 based on signals received from control circuitry 51. In alternate embodiments, switch 40 may comprises elements other than N-channel and P-channel transistors and inverters, provided that switch 40 is configured to couple and decouple the output of gain circuitry 36 to non-inverting input 13 of operational amplifier 12 based on signals received from control circuitry 51. For the sake of convenience, the combination of gain circuitry 36 and switch 40 may be referred to as a gain stage 43.

Gain circuitry 26 and 38, gain stages 27 and 43, and operational amplifier 12 may collectively be referred to as a gain section for convenience.

As shown, switches 30 and 40 are electrically coupled to control circuitry 51. Control circuitry 51 is shown receiving control signals via an SPI interface. In an alternate embodiment, control circuitry 51 receives control signals from a different communication interface, such as, for example, I²C or CAN. Control circuitry 51 is configured to control whether the switches 30 and 40 are in closed or open states. Control circuitry 51, in the present embodiment, is configured to control the open or closed state of switches 30 and 40 based on control signals received via the SPI interface. In an alternate embodiment, control circuitry 51 is configured to control the state of switches 30 and 40 independent of external control signals. In the present embodiment, control circuitry 51 is configured to cause switches 30 and 40 to operate in a coordinated manner, such that when switch 30 is closed, switch 40 is closed, and such that when switch 30 is open, switch 40 is open.

One skilled in the art will appreciate that the gain provided by operational amplifier 12 can be controlled based on the values of the input resistors 16 and 20, feedback resistors 18 and 22, and whether switches 30 and 40 are open or closed. It should be appreciated that operational amplifier 12 is configured to amplify the difference in voltage between the inverting input 11 and non-inverting input 13 of the operational amplifier 12, and provide the amplified difference at the output 15 of operational amplifier 12. In the present embodiment, the resistance values of input resistor 16 and input resistor 20 are equal and have a value Ri, while the resistance values of feedback resistor 18 and feedback resistor 22 are equal and have a value of Rf. One skilled in the art should appreciate that when switches 30 and 40 are in the open position, the gain provided by operational amplifier 12 will be approximately equal to Rf/Ri. It should also be appreciated that when switches 30 and 40 are closed, the gain provided by operational amplifier 12 will be divided by 2, or approximately equal to Rf/Ri divided by 2. Therefore, the gain provided by operational amplifier 12 may be cut in half by electrically coupling gain stages 27 and 43 into the feedback loops of operational amplifier 12 by closing switches 30 and 40. It should be appreciated that if the transistors of the gain circuitry of the gain stages are not equal in size, the amount by which the gain will be divided will not be an integer. To provide a predetermined integer amount by which the gain is to be divided, the transistors of the gain circuitry should be sized the same. To provide a predetermined non-integer amount by which the gain is to be divided, the transistors of the gain circuitry should be sized appropriately to achieve the desired gain. It should also be appreciated that as additional gain stage pairs are added to the sensor interface circuitry 50, the gain provided by operational amplifier 12 will decrease based on the number of additional gain stage pairs added to the circuitry. This is discussed in greater detail below with reference to FIG. 3. In an alternate embodiment, the input resistors may have different resistance values, and the feedback resistors may have different resistance values.

Summarizing the effect of gain circuitry 28 and 30 and switches 30 and 40 in the present embodiment, causing switches 30 and 40 to close causes the effective gain of operational amplifier 12 to be cut in half from the gain provided by operational amplifier 12 when the switches 30 and 40 are left open. In this manner, control circuitry 51, by controlling the state of switches 30 and 40, controls the gain of operational amplifier 12.

Sensor interface circuitry 50 is also shown including a filter 41. In the present embodiment, filter 41 includes filter resistors 44 and 46 and filter capacitors 48 and 49. As shown, the output 15 of operational amplifier 12 is provided as an input to the non-inverting input 61 of a second operational amplifier 52 via filter 41. Operational amplifier 52 also includes an output 65. As shown, the output 65 of operational amplifier 52 is electrically coupled to the non-inverting input 61 of operational amplifier 52 via filter 41. The output 65 of operational amplifier 52 is further electrically coupled to the inverting input of operational amplifier 52 via transmission gates 54 and 56. The inverting input 63 of operational amplifier 52 is also shown coupled to ground via a transmission gate 59. Filter 41, operational amplifier 52 and transmission gates 54, 56 and 59 may collectively be referred to as filter circuitry for convenience.

As shown, transmission gates 54, 56, and 59 are electrically coupled to control circuitry 51. In the present embodiment, control circuitry 51 is configured to control the transmission state of each of transmission gates 54, 56, and 59 based on control signals received via a SPI interface. In an alternate embodiment, control circuitry 51 is configured to control the state of transmission gates 54, 56, and 59 based on control signals received from a bus other than a SPI bus. In yet another alternate embodiment, control circuitry 51 is configured to control the state of transmission gates 54, 56, and 59, independently of external control signals. Each of transmission gates 54, 56, and 59 has an on-state and an off-state, also referred to as a closed state and an open state, respectively.

When transmission gate 54 is in an on-state, transmission gate 54 provides the output signal 65 of operational amplifier 52 to the inverting input 63 of operational amplifier 52. When transmission gate 54 is in an off-state, it does not provide the output signal provided on output 65 of operational amplifier 52 to the inverting input 63 of operational amplifier 52. When transmission gate 56 is in an on-state, it provides the output signal 65 of operational amplifier 52 to the inverting input 63 of operational amplifier 52. When transmission gate 56 is in an off-state, it does not provide the output signal 65 to the inverting input 63. Each of transmission gates 54 and 56 has a different resistance when it is in an on-state. The resistance of transmission gates 54 and 56 is pre-selected, such that when transmission gate 54 or transmission gate 56 is in an on-state, the gain provided by operational amplifier 52, and therefore, the Q of the filtering accomplished by filter 41 in combination with operational amplifier 52 will have predetermined values.

In the present embodiment, control circuitry 51 is configured to control the on and off states of transmission gates 54 and 56. Control circuitry 51 is configured to control transmission gates 54 and 56, such that transmission gate 54 and transmission gate 56 are not on at the same time. One skilled in the art will appreciate that the gain provided by operational amplifier 52 can be altered by selecting which of transmission gates 54 and 56 is in an on-state. One skilled in the art will also appreciate that by altering the gain of operational amplifier 52, the Q of operational amplifier 52 in combination with filter 41 will be altered. According to one embodiment, the transfer function for the filter 42 in combination with operational amplifier 52 can be shown to be as follows:

$$\frac{Vo}{Vi} = \frac{\frac{K}{R_{44}R_{46}C_{48}C_{49}}}{s^2 + s\left(\frac{1}{R_{44}C_{48}} + \frac{1}{R_{46}C_{49}}(1-K) + \frac{1}{R_{44}C_{49}}\right) + \frac{1}{R_{44}R_{46}C_{48}C_{49}}}$$

In this expression, K is equal to the gain of the operational amplifier 52, Vo is the output voltage of the operational amplifier 52, and Vi is the input voltage provided to the filter 41, which, in this case, is equal to the output 15 of the operational amplifier 12. By comparing the above transfer function to the transfer function for a second order system in general form $$\left(\frac{Kw^2}{s^2 + s\frac{w}{Q} + w^2}\right)$$

and selecting $R_{44}=R_{46}=R$ and $C_{48}=C_{49}=C$ for simplification, the cutoff frequency and damping factor of the filter 41, in combination with operational amplifier 52, can be derived. In this case, the cutoff frequency is equal to $$f = \frac{1}{2\pi RC} \text{ and } Q = \frac{1}{3-K},$$

where K is the gain of the operational amplifier 52.

By rearranging the last expression, we see that $$K = 3 - \frac{1}{Q}.$$

This means that in order to obtain a Q of 0.5, the gain K of operational amplifier 52 would need to be equal to 1. To obtain a Q of 1, the gain would need to be equal to 2.

As noted above, transmission gate 54 and transmission gate 56 each have a different resistance value when they are in an on-state. In addition, transmission gate 59, which electrically couples the inverting input 63 of operational amplifier 52 to ground, has a resistance in its on-state. It should be appreciated that the gain K of the operational amplifier 52 is determined by both the resistance of whichever transmission gate 54 or 56 couples the output 65 of operational amplifier 52 to the inverting input 63 of operational amplifier 52, and by the resistance of the transmission gate 59 in its on-state. If transmission gate 54 is in its on-state, the gain will be equal to the on-resistance of transmission gate 54 plus the on-resistance of transmission gate 59 divided by the on-resistance of transmission gate 59. If, however, transmission gate 56 is on, the gain of operational amplifier 52 will be equal to the on-resistance of transmission gate 56 plus the on-resistance of transmission gate 59 divided by the on-resistance of transmission gate 59.

It can be seen, based on the above, that the gain of the operational amplifier 52 can be controlled based on which of transmission gates 54 and 56 are in an on-state. By appropriately determining the on-resistance of each of transmission gates 54 and 56, sensor interface circuitry 50 can be configured, such that the gain provided by operational amplifier 52 is offset by the gain provided by operational amplifier 12.

As noted above, in order to obtain a Q of 0.5 for the filter 41, in combination with operational amplifier 52, the gain of operational amplifier 52 needs to be equal to 1. In order to obtain a Q of 1 for the filter 41 in combination with operational amplifier 52, the gain of operational amplifier 52 needs to be 2. To achieve these gain values, transmission gate 54 is selected, such that the on-resistance of transmission gate 54 in combination with the resistance of transmission gate 59 will result in a gain of 2 based on the formula outlined above. The resistance of transmission gate 56 will also be selected, such that its on-resistance, in combination with the resistance of transmission gate 59 will result in a gain of 1. It should be appreciated that the on-resistance of transmission gate 59 may also be selected to achieve the desired gain.

In the present embodiment, control circuitry 51 is configured, such that when a Q of 1 is desired, transmission gate 54 will be turned on, resulting in a gain of 2 and a Q of 1. Control circuitry 51 is also configured, such that when a Q of 0.5 is desired, transmission gate 56 is turned on, resulting in a gain of 1 and a Q of 0.5. In addition, in order to maintain the overall gain of sensor interface circuitry 50 at approximately 1, control circuitry 51 controls the state of switches 30 and 40, such that the gain of the overall sensor interface circuitry 50 is approximately equal to 1. In other words, when control circuitry 51 turns transmission gate 54 to an on-state to provide a Q of 1, which results in operational amplifier 52 having a gain of 2, control circuitry 51 selects switches 30 and 40 to be in the closed position, such that the gain provided by operational amplifier 12 is equal to one-half. As a result, the overall gain of sensor interface circuitry 50 will be approximately 1. When control circuitry 51 turns transmission gate 56 to an on-state to select a Q of 0.5, the resulting gain of operational amplifier 52 will be equal to 1. In this case, control circuitry 51 is configured to position switches 30 and 40 in the open position, resulting in a gain of 1 provided by operational amplifier 12. As a result, the overall gain of sensor interface circuitry 50 is 1. In this manner, the Q of sensor interface circuitry 50 may be adjusted while maintaining a relatively constant gain through the interface circuitry 50.

Figure 3:
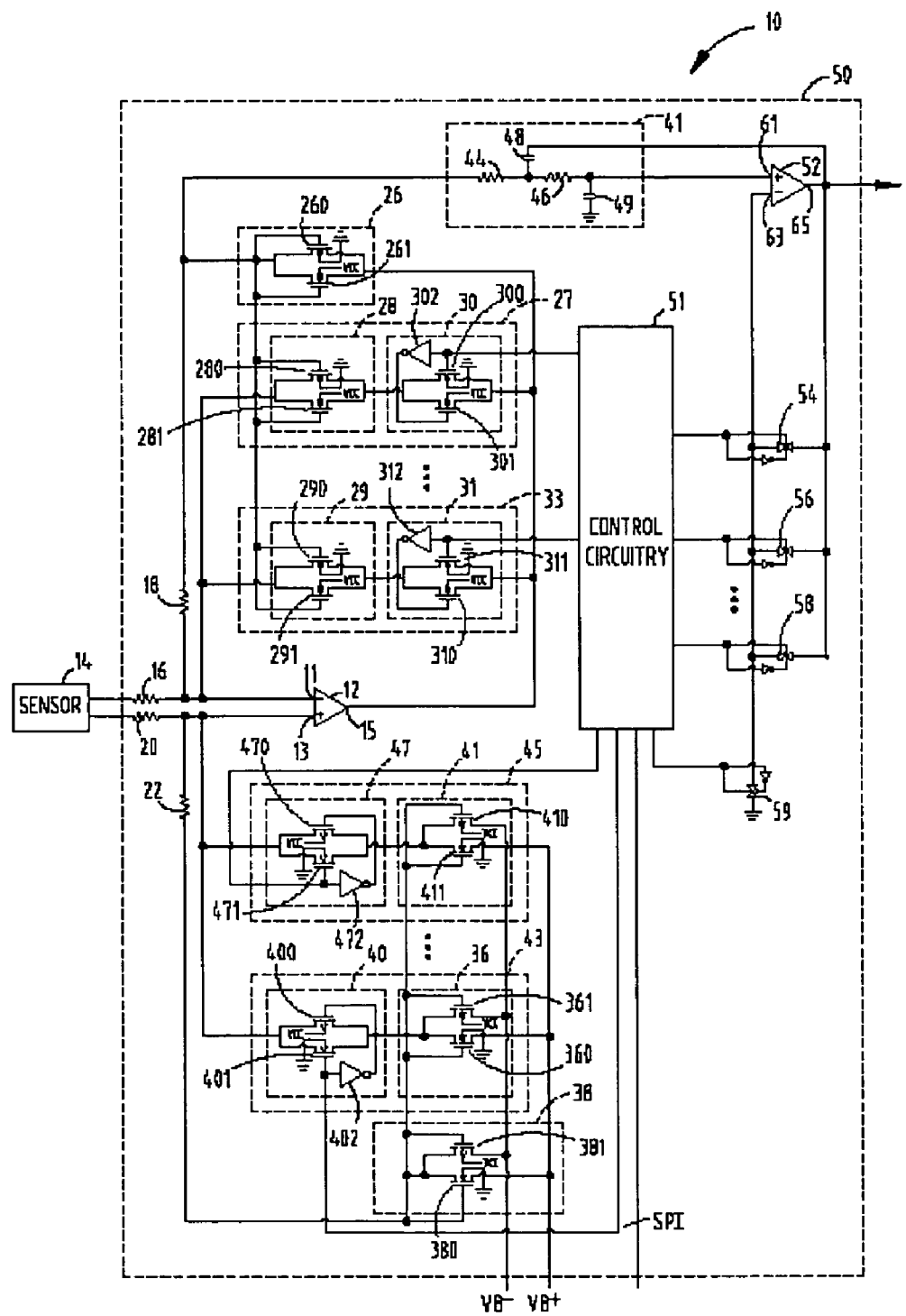
FIG. 3 is a block/circuit diagram generally illustrating sensor interface circuitry, according to another embodiment of the present invention.

FIG. 3 generally illustrates a sensor system 10', according to another embodiment of the present invention. The sensor system 10' of the present embodiment is the same as the sensor system 10 of the previous embodiment generally illustrated in FIG. 2, with the exception being that additions have been made to sensor interface circuitry 50. In the present embodiment, an additional gain stage 33 has been added as a feedback loop between the output 15 of operational amplifier 12 and the inverting input 11 of operational amplifier 12. In addition, an additional gain stage 45 has been coupled to the non-inverting input 13 of operational amplifier 12.

Gain stage 33 operates in a manner similar to gain stage 27 of the previous embodiment. Gain stage 33 includes gain circuitry 29 and a switch 31. Gain circuitry 29 is electrically coupled to the inverting input 11 of operational amplifier 12, switch 31, and gain circuitry 26. Switch 31 is electrically coupled to the output 15 of operational amplifier 12, and to the input of gain circuitry 29. As shown, switch 31 is electrically coupled to control circuitry 51, which is configured to determine when switch 31 is in an open and closed position. When switches 30 and 31 are open, a first feedback current FC1 flows through gain circuitry 26 and feedback resistor 18. When switch 30 or 31 are closed, the feedback current FC1 is divided such that approximately ½ of the feedback current flows through gain circuitry 26 and resistor 18, and ½ of the feedback current flows through the gain circuitry coupled to whichever of switches 30 or 31 are closed. When both switches 30 and 31 are closed, the feedback current FC1 is divided among three feedback paths, such that approximately ⅓ of the feedback current flows through gain circuitry 26 and resistor 18, ⅓ of the feedback current flows through gain circuitry 28, and ⅓ of the feedback current flows through gain circuitry 29. In this manner, the gain of operational amplifier 12 may be controlled by controlling the states of the switches 30 and 31. As with the previous embodiment, gain circuitry 29 of the present embodiment includes two transistors, an N-transistor 290 and a P-transistor 291. As above, the transistors of gain circuitry 26; gain circuitry 28, and gain circuitry 29 are configured to operate in a current mirror configuration to provide the appropriate current as discussed above. More specifically, the gates of the transistors of gain circuitry 29 are electrically coupled to the gates of the transistors of gain circuitry 26 and gain circuitry 28. In the present embodiment, switch 31 comprises an N-channel transistor 311, a P-channel transistor 310, and an inverter 312.

Gain stage 45 operates in a manner similar to gain stage 43 of the previous embodiment generally illustrated in FIG. 2. Gain stage 45 includes gain circuitry 41 and a switch 47. Gain circuitry 41 is electrically coupled to switch 47 and to voltages VB+ and VB−. The output signal provided by gain circuitry 41 is in part a function of the voltages VB+ and VB−. Switch 47 is electrically coupled to the non-inverting input 13 of operational amplifier 12 and the output of gain circuitry 41 such that when switch 47 is closed, the output of gain circuitry 41 is electrically coupled to the non-inverting input 13 of operational amplifier 12. As shown, switch 47 is also electrically coupled to control circuitry 51, which is configured to determine when switch 47 is in an open and closed position. Gain circuitry 41, 36 and 38 are electrically coupled together such that the amount of current provided by each of gain circuitry 41, 36 and 38 may be regulated as discussed below. When switches 47 and 40 are open, a second feedback current, referred to as FC2, flows through the feedback resistor 22. When switch 47 or 40 are closed, the feedback current is divided across two feedback paths such that ½ of the feedback current flows through resistor 22 and ½ of the feedback current flows through the gain circuitry coupled to whichever of switches 47 or 40 are closed. When both switches 40 and 47 are closed, the feedback current FC2 is divided among three feedback paths, such that ⅓ of the feedback current flows through resistor 22, ⅓ of the feedback current flows through gain circuitry 41, and ⅓ of the feedback current flows through gain circuitry 36. In this manner, the gain of operational amplifier 12 may be controlled by controlling the states of switches 47 and 40. As with the previous embodiment, gain circuitry 41 of the present embodiment includes an N-transistor 411 and a P-transistor 410. As above, the transistors of gain circuitry 38, 36 and 41 are configured to operate in a current mirror configuration to provide the appropriate current as discussed above based on the state of switches 47 and 40. More specifically, the gates of the transistors of gain circuitry 38, 36 and 41 are tied together to achieve the desired current characteristics. In the present embodiment, switch 47 comprises an N-channel transistor 471, a P-channel transistor 470, and an inverter 472.

As noted above with respect to the previous embodiment generally illustrated in FIG. 2, the addition of gain stages to operational amplifier 12 can operate to reduce the gain provided by operational amplifier 12. More specifically, the addition of gain stages 33 and 45 can reduce the gain provided by operational amplifier 12 when the switches coupled to these gain stages are in a closed state. In the present embodiment, as in the previous embodiment, the feedback resistance values of feedback resistors 18 and 22 are equal, having a value Rf. The resistance values of input resistors 16 and 20 are also equal, having a value Ri. When switches 30, 31, 47, and 40 are open, the gain of operational amplifier 12 is equal to the resistance of feedback resistor Rf divided by the resistance of feedback resistor Ri, or Rf/Ri. When switches 28 or 29 and 40 or 47 are closed, the gain of operational amplifier 12 is equal to Rf/Ri divided by 2. When switches 28, 29, 40 and 47 are all closed, the gain of operational amplifier 12 is equal to Rf/Ri divided by 3. It can be seen that as additional gain stage pairs are added to the circuit, the factor by which the gain of the operational amplifier 12 is divided is increased. If there are n feedback path pairs electrically coupled to the operational amplifier, then the amount by which the gain of the operational amplifier is decreased is equal to the gain of the operational amplifier divided by n. For example, if there are 4 feedback path pairs electrically coupled to the operational amplifier 12, the gain of the operational amplifier would be Rf/Ri divided by 4. Extending this to a more general case, if there are n feedback path pairs electrically coupled to the operational amplifier, the gain of the operational amplifier would be Rf/Ri divided by n. In this manner, the gain of operational amplifier 12, and therefore the gain of sensor interface circuitry 50, can be adjusted by adding gain stages, and opening and closing switches coupled to the gain stages to switch them into and out of the circuit.

It should be appreciated that in other alternate embodiments, the resistance values of feedback resistor 18 and feedback resistor 22 may be different, and the resistance values of input resistor 16 and input resistor 20 may be different. In these alternate embodiments, additional feedback stages will still serve to vary the gain of operational amplifier 12. One skilled in the art will be able to calculate the precise gain using the feedback and input resistance values, along with the number of stages having their switches in the closed position.

It should be also appreciated that if the transistors of the gain circuitry are not equal in size, the amount by which the gain will be divided will not be an integer. To provide a predetermined integer amount by which the gain is to be divided, the transistors should be sized the same. To provide a predetermined non-integer amount by which the gain is to be divided, the transistors of the gain stages should be sized appropriately to achieve the desired gain.

Sensor interface circuitry 50 is also shown including an additional transmission gate 58 electrically coupled to the output 65 of operational amplifier 52 and the inverting input 63 of operational amplifier 52. Transmission gate 58 is also electrically coupled to control circuitry 51, which controls the on- or off-state of transmission gate 58. As with transmission gates 54 and 56, transmission gate 58 has a predetermined resistance when transmission gate 58 is in an on-state. The on-resistance of transmission gate 58 is different from the on-resistance of transmission gate 56 and transmission gate 54. Transmission gate 58 operates in a manner similar to transmission gates 54 and 56 of the previous embodiment.

Control circuitry 51 operates to turn on transmission gate 54, 56, or 58, depending on the desired Q value for the filter 41 in combination with operational amplifier 52. As noted above, only one of transmission gates 54, 56, and 58 will be on at any given time. The resistance values of each of transmission gates 54, 56, and 58 are each selected, such that when the transmission gate is in the on position, operational amplifier 52 has a predefined gain K, causing the combination of filter 41 and operational amplifier 52 to have a predetermined Q value, in accordance with the formula provided above with respect to the embodiment generally illustrated in FIG. 2.

Control circuitry 51 is also configured to control the switches 30, 31, 47, and 40 to switch gain stages 27, 33, 45, and 43 on and off, as needed, such that the gain of operational amplifier 12 offsets any gain provided by operational amplifier 52. In other words, control circuitry 51 controls the on/off-state of transmission gates 54, 56, and 58 to achieve a selected Q value, while controlling the open and close states of switches 30, 31, 47, and 40, such that the overall gain through sensor interface circuitry 50 is equal to 1.

As is shown in FIG. 3, in alternate embodiments, additional transmission gate stages can be added beyond transmission gates 54, 56, and 58 to allow for the provision of additional gain levels K for operational amplifier 52, and therefore, additional Q values. As additional transmission gates are added to sensor interface circuitry 50, corresponding gain stages are also coupled to operational amplifier 12, such that the gain of operational amplifier 52 can be offset. It should be appreciated that because the gain stages coupled to operational amplifier 12 operate to offset the overall gain of sensor interface circuitry 50 regardless of the Q value selected by control circuitry 51 the overall gain of sensor interface circuitry 50 will be determined by the ratio of feedback resistors 18 and 22 and input resistors 16 and 20, independent of the Q value selected by control circuitry 42.

In one alternate embodiment, the gain stages electrically coupled to the non-inverting input 13 of operational amplifier 12, along with feedback resistor 22, can be removed without departing from the teachings of the present invention. In this alternate embodiment, the factor by which the gain of operational amplifier 12 will be divided will be based on the total number of feedback paths coupled to the inverting input 11 of operational amplifier 12. For example, if there are two feedback paths coupled to the inverting input 11 of operational amplifier 12, as generally illustrated in FIG. 2, and if the switch 30 is closed, the gain provided by operational amplifier 12 will be equal to Rf/Ri divided by 2. If the switch 30 is open, the gain provided by operational amplifier 12 will be equal to Rf/Ri divided by 1, or simply Rf/Ri.

In one embodiment, the control circuitry 51 receives control signals from external circuitry via a communications bus, such as, for example, a SPI bus, indicating the Q value to be selected by the control circuitry 51.

Figure 4:
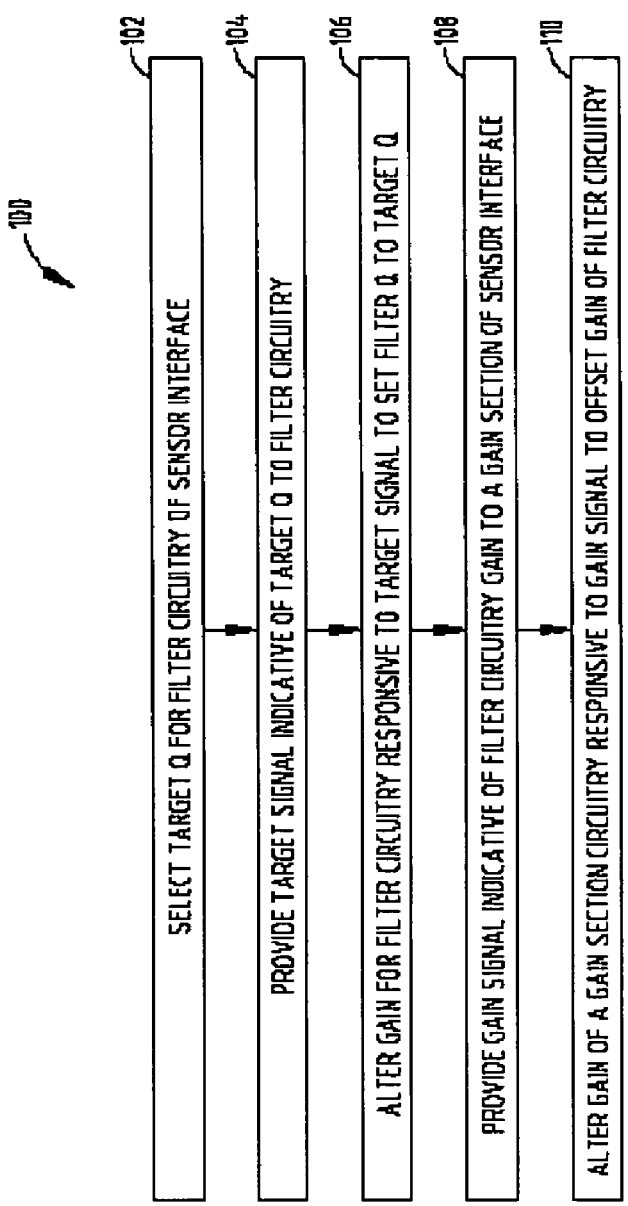
FIG. 4 is a flow diagram generally illustrating a method for adjusting a sensor interface, according to one embodiment of the present invention.

Referring to FIG. 4, a method 100 for adjusting the gain and Q of the sensor interface circuitry 50 is provided. According to a first step 102 of the method 100, a target Q value is selected for filter circuitry of a sensor interface. In a second step 104 of the method 100, a target signal indicative of the target Q value is provided to the filter circuitry. In a third step 106 of the method 100, the Q of the filter circuitry is set to the target Q level by adjusting the gain of the filter circuitry. In a fourth step 108 of the method 100, a gain signal that is indicative of the gain of the filter circuitry is provided to a gain section of the sensor interface. In a fifth step 110 of the method 100, the gain of the gain section is altered responsive to the gain signal such that the gain provided by the gain section offsets the gain of the filter circuitry.

The circuitry and method, as described above, advantageously provide for the ability to electronically adjust the Q of sensor interface circuitry, while maintaining the overall gain of the sensor interface circuitry equal to 1. The method and circuitry additionally advantageously provide for the ability to adjust the overall gain of the sensor interface circuitry by changing external feedback resistors and input resistors independent from the Q value selected.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An adjustable sensor interface, comprising:
   a first operational amplifier comprising a first inverting input, a first non-inverting input, and a first output;
   first gain circuitry comprising an input coupled to said first output of said operational amplifier, said first gain circuitry also comprising an output;
   a first gain stage comprising a gain stage input coupled to said first output of said operational amplifier, an output, and a first gain stage switch configured to have a closed state and an open state, said first gain stage being electrically coupled to said first gain circuitry;
   a first resistor having a first end coupled to said output of said first gain circuitry, said resistor further having a second end coupled to said output of said first gain stage and said inverting input of said first operational amplifier; and
   control circuitry coupled to said first gain stage and configured to control a state of said first gain stage switch, wherein said first gain circuitry is configured to provide a first feedback current at said second end of said first resistor when said first gain stage switch is in an open state, and wherein said first gain stage and said first gain circuitry are each configured to provide a feedback current having an approximately equal magnitude at said second end of said first resistor when said first gain stage switch is in a closed state, and wherein a gain of said first operational amplifier is varied based on the state of said first gain stage switch.

2. The adjustable sensor interface of claim 1, further comprising:
filter circuitry configured to filter an electronic signal;
a second operational amplifier comprising a second inverting input, a second non-inverting input, and a second output, said second non-inverting input being coupled to said first output of said first operational amplifier through said filter circuitry, said second non-inverting input being further coupled to said second output through said filter circuitry;
a ground switch electrically coupled to ground and to said second inverting input, said ground switch being configured to have a closed state in which said ground switch has a ground switch resistance and electrically couples said second inverting input to ground;
a first feedback switch electrically coupled to said second output and said second inverting input, said first feedback switch being configured to have a closed state in which said first feedback switch has a first feedback switch resistance and electrically couples said second output to said second inverting input; and
a second feedback switch electrically coupled to said second output and said second inverting input, said second feedback switch being configured to have an on state in which said second feedback switch has a second feedback switch resistance and electrically couples said second output to said second inverting input;
wherein said control circuitry is coupled to said first feedback switch and said second feedback switch, and wherein said control circuitry is further configured to cause said first and second feedback switches to enter and exit a closed state to vary a gain of said second operational amplifier.

3. The adjustable sensor interface of claim 2, wherein said control circuitry is configured to control the state of said switches to select a Q value of the adjustable sensor interface, a gain of said first operational amplifier and a gain of said second operational amplifier, such that the gain provided by said second operational amplifier is offset by the gain provided by said first operational amplifier.

4. The adjustable sensor interface of claim 1, wherein said first gain stage comprises at least one transistor configured to function as part of a current mirror circuit.

5. The adjustable sensor interface of claim 2, wherein at least one of said feedback switches is a transmission gate.

6. The adjustable sensor interface of claim 1, further, comprising:
second gain circuitry comprising an input coupled to a voltage source, said second gain circuitry also comprising an output
a second gain stage comprising a gain stage input coupled to the voltage source, an output, and a second gain stage switch configured to have a closed state and an open state, said second gain stage being electrically coupled to said second gain circuitry and said control circuitry; and
a second resistor having a first end coupled to said output of said second gain circuitry, said resistor further having a second end coupled to said output of said second gain stage and said non-inverting input of said first operational amplifier, wherein said second gain circuitry is configured to provide a second feedback current at said second end of said second resistor when said second gain stage switch is in an open state, and wherein said second gain stage and said second gain circuitry are each configured to provide a feedback current having an approximately equal magnitude at said second end of said second resistor when said second gain stage switch is in a closed state, and wherein a gain of said first operational amplifier is varied based on the state of said second gain stage switch.

7. The adjustable sensor interface of claim 6, further comprising:
filter circuitry configured to filter an electronic signal;
a second operational amplifier comprising a second inverting input, a second non-inverting input, and a second output, said second non-inverting input being coupled to said first output of said first operational amplifier through said filter circuitry, said second non-inverting input being further coupled to said second output through said filter circuitry;
a ground switch electrically coupled to ground and to said second inverting input, said ground switch being configured to have a closed state in which said ground switch has a ground switch resistance and electrically couples said second inverting input to ground;
a first feedback switch electrically coupled to said second output and said second inverting input, said first feedback switch being configured to have a closed state in which said first feedback switch has a first feedback switch resistance and electrically couples said second output to said second inverting input; and
a second feedback switch electrically coupled to said second output and said second inverting input, said second feedback switch being configured to have an on state in which said second feedback switch has a second feedback switch resistance and electrically couples said second output to said second inverting input;
wherein said control circuitry is coupled to said first feedback switch and said second feedback switch, and wherein said control circuitry is further configured to cause said first and second feedback switches to enter and exit a closed state to vary a gain of said second operational amplifier.

8. The adjustable sensor interface of claim 7, further comprising a first input resistor coupled to said first inverting input of said first operational amplifier and a second input resistor coupled to said first non-inverting input of said first operational amplifier.

9. The adjustable sensor interface of claim 7, further comprising a sensor coupled to said first inverting input of said first operational amplifier through said first input resistor and said first non-inverting input of said first operational amplifier through said second input resistor.

10. The adjustable sensor interface of claim 7, wherein said control circuitry is configured to control the state of said switches to select a Q value of the adjustable sensor interface, a gain of said first operational amplifier and a gain of said second operational amplifier, such that a gain provided by said second operational amplifier is offset by a gain provided by said first operational amplifier.

11. The adjustable sensor interface of claim 6, wherein said first gain stage and said first gain circuitry comprises transistors configured in a current mirror configuration.

12. The adjustable sensor interface of claim 7, wherein said filter circuitry comprises at least two resistors and two capacitors, and wherein the value of the at least two resistors is equal, and wherein the value of the at least two capacitors is equal.

13. The adjustable sensor interface of claim 7, further comprising a communications bus coupled to said control circuitry, wherein said communications bus is configured to provide control signals to said control circuitry to cause said control circuitry to control the gain and Q of the sensor interface.

14. The adjustable sensor interface of claim 7, wherein the closed state resistances of said first feedback switch and said second feedback switch are different.

15. The adjustable sensor interface of claim 7, wherein said control circuitry is configured to control said switches such that when said first and second gain stage switches are in a closed state, only said first feedback switch is closed, and such that when said first and second gain stage switches are in an open state, only said second feedback switch is closed.

16. The adjustable sensor interface of claim 7, further comprising:
  a third gain stage comprising a gain stage input coupled to said first output of said operational amplifier, an output coupled to said second end of said first resistor, and a third gain stage switch configured to have a closed state and an open state, said third gain stage being electrically coupled to said first gain circuitry and said control circuitry, wherein said first gain stage, said third gain stage and said first gain circuitry are each configured to provide a feedback current having an approximately equal magnitude at said second end of said first resistor when said first gain stage switch and said third gain stage switch are in a closed state, and wherein a gain of said first operational amplifier is varied based on the state of said first gain stage switch and said second gain stage switch;
  a fourth gain stage comprising a gain stage input coupled to the voltage source, an output coupled to said second end of said second resistor, and a fourth gain stage switch configured to have a closed state and an open state, said fourth gain stage being electrically coupled to said second gain circuitry and said control circuitry, wherein said second gain stage, said fourth gain stage, and said second gain circuitry are each configured to provide a feedback current having an approximately equal magnitude at said second end of said second resistor when said second and fourth gain stage switches are in a closed state, and wherein a gain of said first operational amplifier is varied based on the state of said second gain stage switch and said fourth gain stage switch; and
  a third feedback switch electrically coupled to said control circuitry, said second output and said second inverting input, said third feedback switch being configured to have an on state in which said third feedback switch has a third feedback switch resistance and electrically couples said second output to said second inverting input, wherein said control circuitry is further configured to cause said third and fourth gain stage switches to enter connected and disconnected states to vary a gain of said first operational amplifier, and wherein said control circuitry is further configured to cause said third feedback switch to enter and exit a closed state to vary a gain of said second operational amplifier.

17. The adjustable sensor interface of claim 16, wherein said control circuitry is configured to control the state of said switches to select a Q value of the adjustable sensor interface, a gain of said first operational amplifier and a gain of said second operational amplifier, such that a gain provided by said second operational amplifier is offset by a gain provided by said first operational amplifier.

18. The adjustable sensor interface of claim 16, wherein said control circuitry is configured to control said switches such that when said first and second gain stage switches are in a closed state, only said first feedback switch is closed, and such that when no gain stage switches are in a closed state, only said second feedback switch is closed, and such that when said first, second, third and fourth gain stage switches are in a closed state, only said third feedback switch is closed.

19. An adjustable sensor interface, comprising:
  a first operational amplifier comprising a first inverting input, a first non-inverting input, and a first output;
  first gain circuitry comprising an input coupled to said first output of said operational amplifier, said first gain circuitry also comprising an output;
  a first gain stage comprising a gain stage input coupled to said first output of said operational amplifier, an output, and a first gain stage switch configured to have a closed state and an open state, said first gain stage being electrically coupled to said first gain circuitry;
  a first resistor having a first end coupled to said output of said first gain circuitry, said resistor further having a second end coupled to said output of said first gain stage and said inverting input of said first operational amplifier;
  control circuitry coupled to said first gain stage and configured to control a state of said first gain stage switch, wherein said first gain circuitry is configured to provide a first feedback current at said second end of said first resistor when said first gain stage switch is in an open state, and wherein said first gain stage and said first gain circuitry are each configured to provide a feedback current having an approximately equal magnitude at said second end of said first resistor when said first gain stage switch is in a closed state, and wherein a gain of said first operational amplifier is varied based on the state of said first gain stage switch;
  filter circuitry configured to filter an electronic signal;
  a second operational amplifier comprising a second inverting input, a second non-inverting input, and a second output, said second non-inverting input being coupled to said first output of said first operational amplifier through said filter circuitry, said second non-inverting input being further coupled to said second output through said filter circuitry;
  a ground switch electrically coupled to ground and to said second inverting input, said ground switch being configured to have a closed state in which said ground switch has a ground switch resistance and electrically couples said second inverting input to ground when said ground;
  a first feedback switch electrically coupled to said second output and said second inverting input, said first feedback switch being configured to have a closed state in which said first feedback switch has a first feedback switch resistance and electrically couples said second output to said second inverting input; and
  a second feedback switch electrically coupled to said second output and said second inverting input, said second feedback switch being configured to have an on state in which said second feedback switch has a second feedback switch resistance and electrically couples said second output to said second inverting input, wherein said control circuitry is coupled to said first feedback switch and said second feedback switch, and wherein said control circuitry is further configured to cause said first and second feedback switches to enter and exit a closed state to vary a gain of said second operational amplifier.

20. The adjustable sensor interface system of claim 19, further comprising a sensor coupled to said first inverting input and said first non-inverting input of said first operational amplifier via at least one input resistor.

21. The adjustable sensor interface system of claim 20, wherein said sensor is a vehicle sensor.

22. The adjustable sensor interface system of claim 21, wherein said sensor is an engine knock sensor.

* * * * *